(12) United States Patent
Mitchell

(10) Patent No.: US 9,452,375 B2
(45) Date of Patent: Sep. 27, 2016

(54) WATER FILTER CARTRIDGE AND VALVE WITH AUTOBYPASS FEATURE

(75) Inventor: Alan J. Mitchell, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 2024 days.

(21) Appl. No.: 12/687,397

(22) Filed: Jan. 14, 2010

(65) Prior Publication Data

US 2010/0116730 A1     May 13, 2010

Related U.S. Application Data

(63) Continuation of application No. 11/427,795, filed on Jun. 30, 2006.

(51) Int. Cl.
| | | |
|---|---|---|
| *B01D 35/153* | (2006.01) | |
| *B01D 35/147* | (2006.01) | |
| *C02F 9/00* | (2006.01) | |

(52) U.S. Cl.
CPC ............ B01D 35/147 (2013.01); C02F 9/005 (2013.01); B01D 2201/302 (2013.01)

(58) Field of Classification Search
CPC .......... B01D 35/147; B01D 2201/302; C02F 9/005
USPC .......................... 210/234, 235, 141, 431, 429
See application file for complete search history.

(56) References Cited

U.S. PATENT DOCUMENTS

| | | | | | |
|---|---|---|---|---|---|
| 2,955,712 | A | * | 10/1960 | Gutkowski | .......... B01D 35/147 210/133 |
| 3,513,981 | A | * | 5/1970 | Mendelow | ........... B01D 29/668 137/625.15 |
| 3,828,932 | A | * | 8/1974 | Schneer | .............. F16K 11/0743 137/625.15 |
| 4,832,836 | A | * | 5/1989 | Selsdon | ........................ 210/133 |
| 5,826,854 | A | * | 10/1998 | Janvrin | .................. B01D 27/08 137/549 |
| 6,457,322 | B1 | * | 10/2002 | Kim et al. | ....................... 62/318 |
| 6,458,269 | B1 | * | 10/2002 | Bassett | .................. B01D 27/08 210/119 |
| 6,635,175 | B2 | * | 10/2003 | Stankowski | ........... B01D 35/30 210/232 |
| 2003/0010698 | A1 | * | 1/2003 | Fritze | .................... B01D 35/306 210/235 |
| 2003/0024259 | A1 | * | 2/2003 | Jenkins | .................. B01D 35/30 62/318 |
| 2004/0211717 | A1 | * | 10/2004 | Mitchell | .............. B01D 35/153 210/235 |
| 2004/0211931 | A1 | * | 10/2004 | Olson | .................. B01D 35/147 251/149.9 |
| 2006/0091047 | A1 | * | 5/2006 | Ye | ...................... B01D 21/0012 210/109 |

FOREIGN PATENT DOCUMENTS

| | | | | |
|---|---|---|---|---|
| CN | 2741960 Y | * | 11/2005 | ......... B01D 21/0012 |
| JP | H09196204 A | * | 7/1997 | ............. B01D 65/00 |

OTHER PUBLICATIONS

Office Action from parent U.S. Appl. No. 11/427,795, dated Nov. 4, 2015.*

* cited by examiner

*Primary Examiner* — Bobby Ramdhanie
*Assistant Examiner* — Denise R Anderson

(57) ABSTRACT

A replaceable filter for a liquid filter cartridge system having a valve body and a valve actuator relatively rotatable to control fluid flow through the valve by aligning and unaligning respective fluid inlet passages and fluid outlet passages of the valve body and the valve actuator.

40 Claims, 9 Drawing Sheets

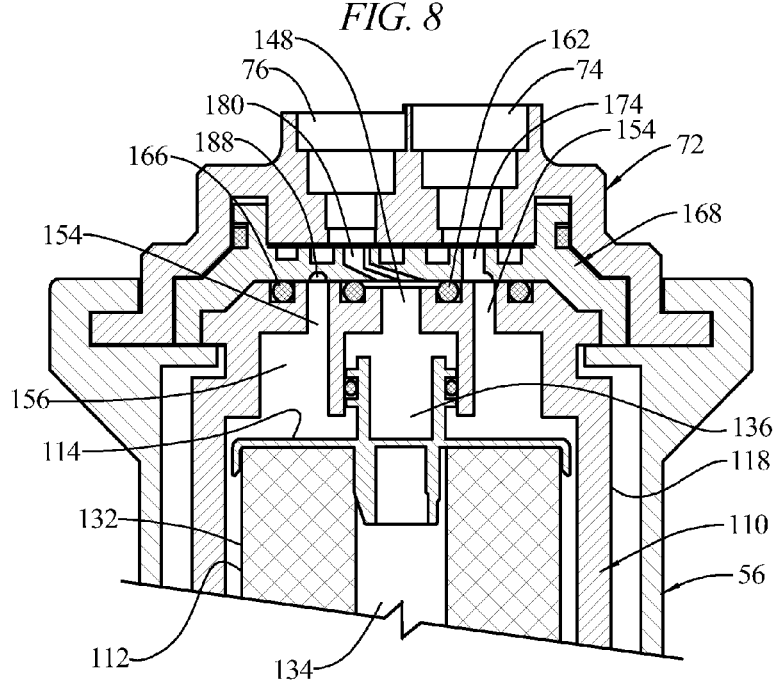
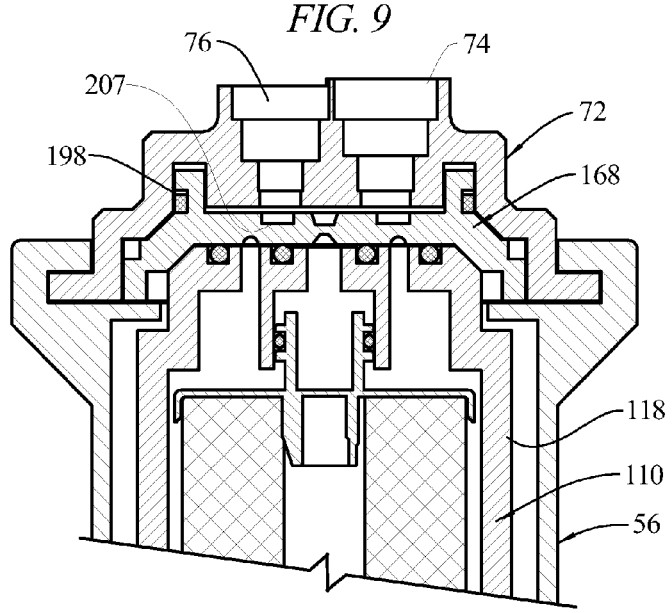

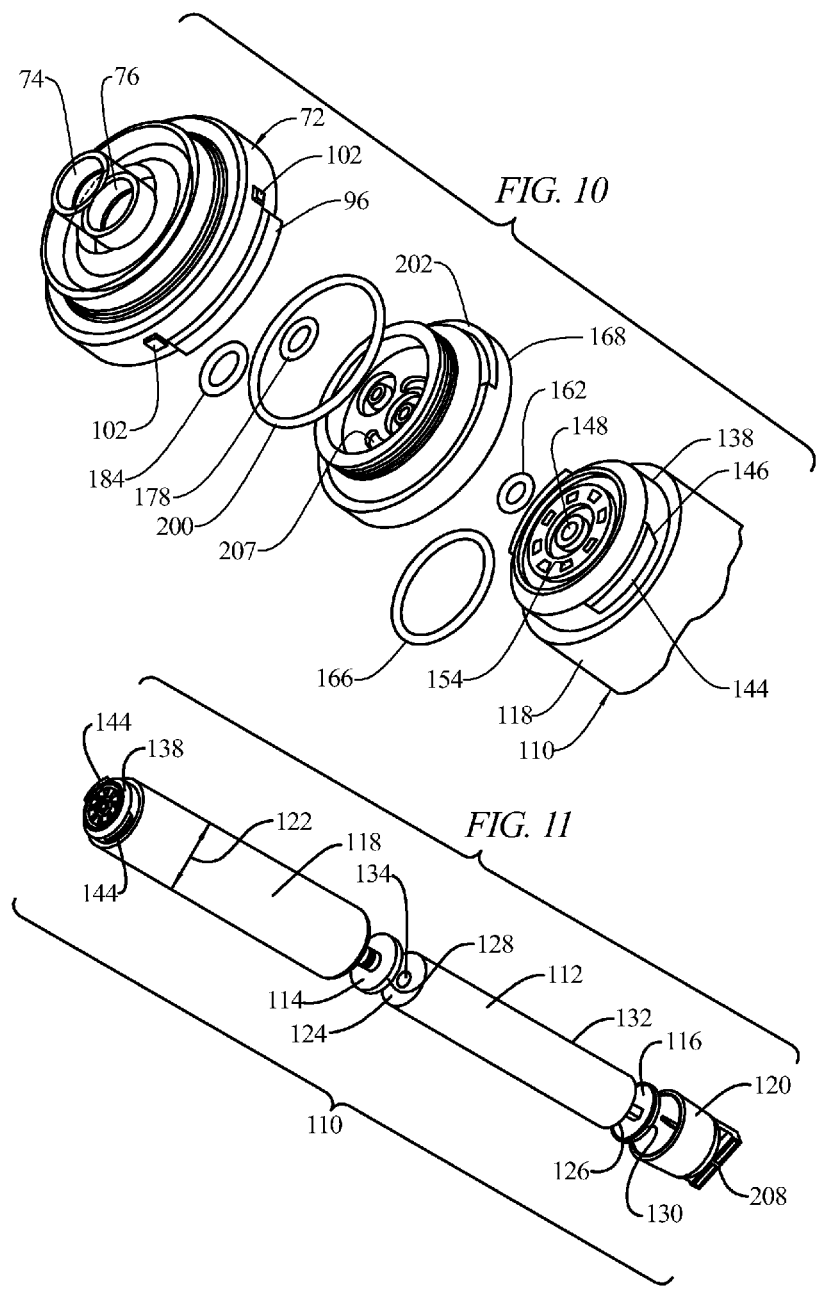

WATER FILTER CARTRIDGE AND VALVE WITH AUTOBYPASS FEATURE

CROSS-REFERENCE TO RELATED APPLICATION

This application is a continuation of U.S. patent application Ser. No. 11/427,795, filed Jun. 30, 2006, which is incorporated herein in its entirety.

BACKGROUND OF THE INVENTION

The present invention relates to filters for water and other liquids.

Filters are widely used to separate impurities and solids from liquids in a variety of applications. For example, filters are used in water lines to provide water in which dissolved minerals and other particles may be removed. Filters are also used in lubrication and fuel lines to remove metals and other solids from the lubricant or fuel.

Because the filters have a relatively short lifetime, compared to the equipment they are used in association with, such as water dispensers, etc., the filters are arranged to be removed and replaced from time to time. The removal and replacement feature requires that there be an interface between the filter and the remainder of the liquid system which typically requires a seal at the interface, in that generally the liquid moving through the filter is at a pressure elevated above ambient pressure.

In some systems, removal of the filter creates an opening in the liquid line, requiring replacement of the filter before the system can be used. For example, Great Britain U.S. Pat. No. 1,296,051 discloses a removable filter, that once removed, leaves a disconnected path at a head portion between an inlet and an outlet in the liquid line that requires replacement of the filter before the system can be used. The filter is sealed to the head portion via a sealing ring and a hollow plug which provide sealing interfaces at different planes, and are engaged in a sliding manner between mating surfaces when the filter is attached to the head portion via a bayonet mount arrangement. U.S. Pat. No. 4,764,275 discloses a removable filter, that once removed, leaves a disconnected path at a filter mount between an inlet and an outlet in the liquid line that requires replacement of the filter before the system can be used. The filter is sealed to the filter mount via an O-ring radial seal that slidingly engages a side wall of the filter mount and a gasket that slidingly engages a face of the filter mount, located in a plane different than the side wall of the filter mount.

In other systems, a valve is provided to close off the liquid line when the filter is removed, also requiring replacement of the filter before the system can be used. For example, U.S. Pat. No. 5,826,854 discloses a removable filter that engages with a rotatable block to rotate the block relative to a valve housing, to align and misalign the inlet and outlet passages. The filter is sealed to the actuator via 2 radial seal O-rings lying in different planes that slidingly seal against an inside side wall of the block as the filter in inserted into the block.

In still other systems, some type of valve or bypass arrangement is provided so that the system can remain in use, even with the filter removed. For example, U.S. Pat. No. 5,390,701 discloses a removable filter that engages with a rotatable housing member to rotate the housing member relative to a valve body, to align and misalign the inlet and outlet passages, and to align radial bypass passages formed in the housing member to allow the system to remain in use with the filter removed. The filter is sealed to the valve body via an axial seal member that slides against a face of the valve body as the filter is threaded onto the housing member. U.S. Patent Application Publication US2006/0070942 A1 discloses a water purifying apparatus with a removable filter that engages with a rotatable inner case to rotate the inner case relative to an outer case, to align and misalign the inlet and outlet passages, and to align a transverse bypass passage formed on an outer face of the inner case to allow the system to remain in use with the filter removed. The filter is sealed to the inner case via two radial seal O-rings that slide into place relative to the inner case, in different planes, as the filter is engaged with the inner case.

Sliding sealing surfaces allow for the seals to twist or move or to allow the surfaces or impurities to cause wear of the seal, potentially compromising the integrity of the seal.

BRIEF DESCRIPTION

A replaceable filter for a liquid filter cartridge system has a valve body having a fluid inlet passage and a fluid outlet passage and a valve actuator having a fluid inlet passage and a fluid outlet passage, with the valve body and valve actuator being relatively rotatable to control fluid flow through the valve by aligning and unaligning the respective fluid inlet passages and fluid outlet passages. The replaceable filter comprises a cartridge defining an interior, a filter body located within the interior, a first end provided on the cartridge having an end face, a rotational coupler and a face seal provided on the end face and arranged to abut the valve actuator when the filter is coupled with the valve actuator. The first end has a fluid inlet passage extending through the end face into the interior and a fluid outlet passage extending through the end face into the interior. The rotational coupler is provided on the first end, rotationally coupling the filter with the valve actuator for co-rotation. When the filter is coupled with the valve actuator for co-rotation, the face seal abuts the valve actuator to form a seal between the first end and the valve actuator that fluidly seals the fluid inlet passage and the fluid outlet passage of the first end.

BRIEF DESCRIPTION OF THE DRAWINGS

FIG. 8 is a side sectional view of an end of the assembled water filter cartridge and housing with the valve shown in the filtering position.

FIG. 9 is a side sectional view of an end of the assembled water filter cartridge and housing with the valve shown in the bypass/removal position.

FIG. 10 is an enlarged exploded view of the valve components of the system.

FIG. 11 is an exploded view of the components of the water filter.

DETAILED DESCRIPTION OF THE PREFERRED EMBODIMENTS

Figure 1:
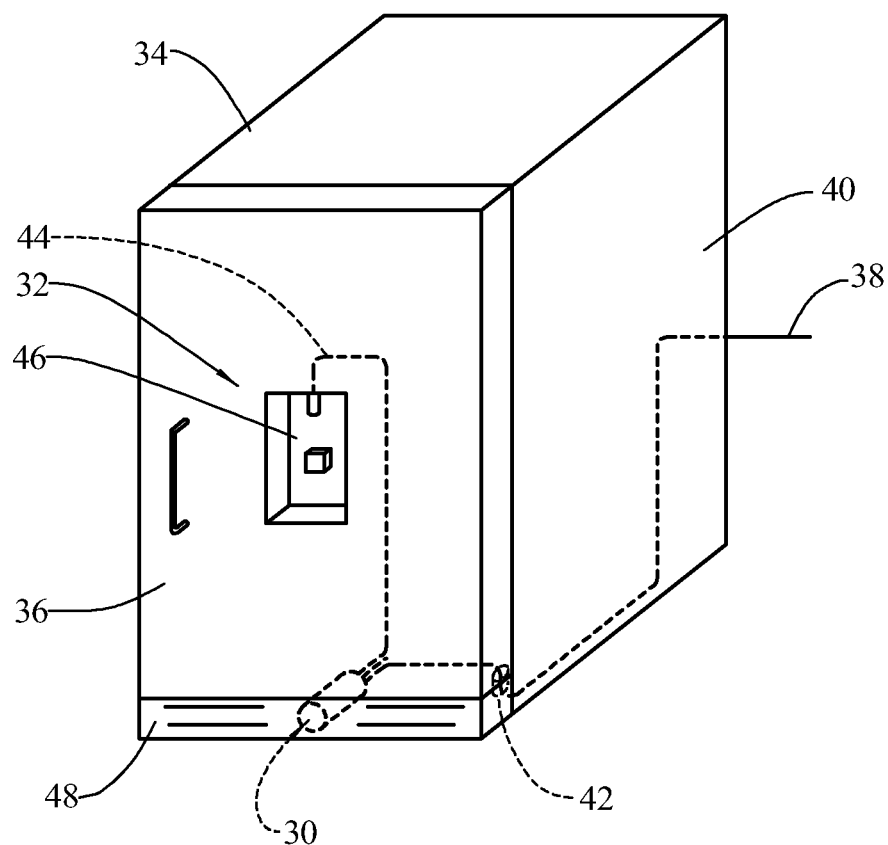
FIG. 1 is a schematic perspective view of a refrigeration appliance in which the water filter cartridge system embodying the principles of the present invention may be used.
Figure 2:
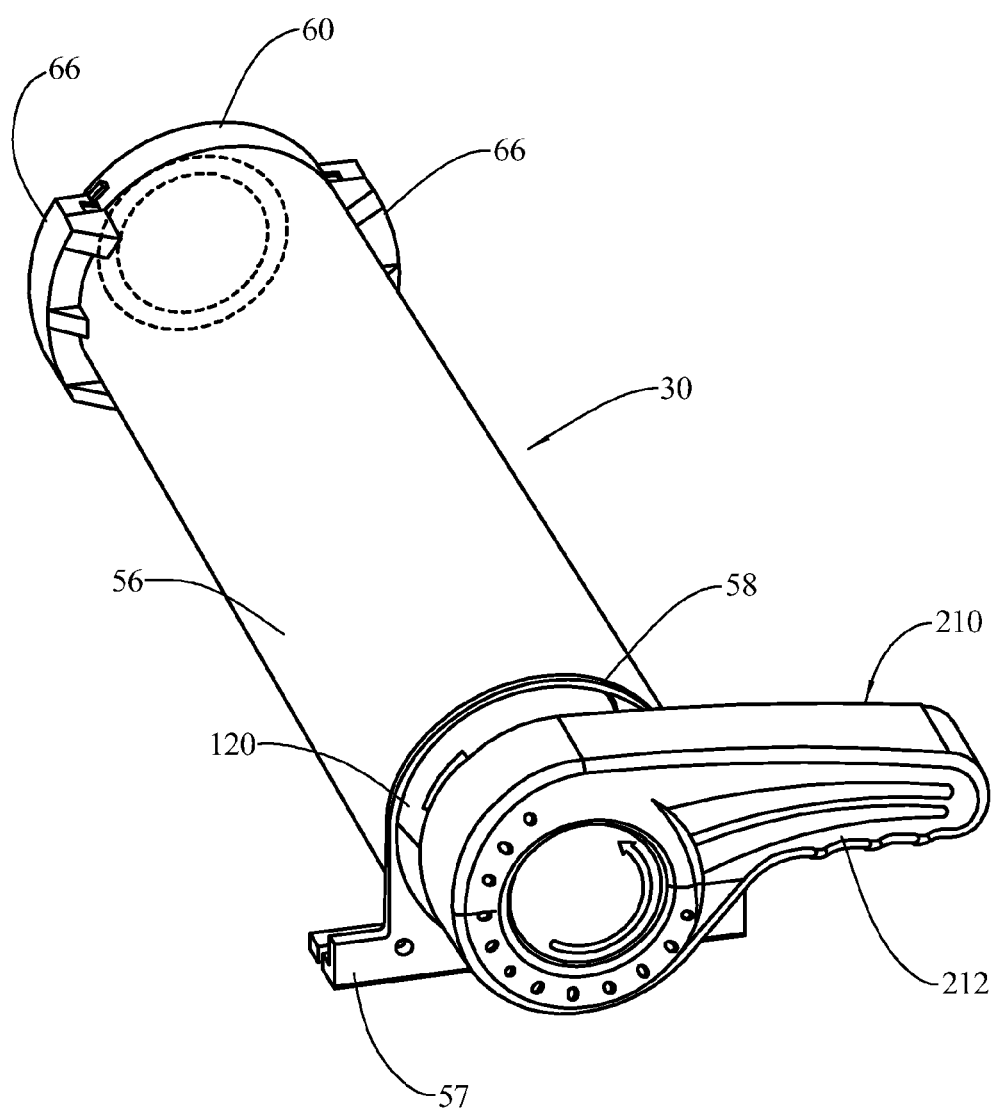
FIG. 2 is a perspective view of the water filter cartridge system embodying the principles of the present invention shown in isolation.

As schematically illustrated in FIG. 1, the present invention provides a water filter cartridge system 30, shown in isolation in FIG. 2, which may find particular utility in a water dispensing system 32, such as found in a refrigeration appliance 34. The present invention also has utility in other appliances and environments and for filtering liquids other than water. For purposes of disclosing an embodiment of the invention, it will be disclosed in the environment of a water dispensing system 32 in a domestic refrigerator 34 where the water is dispensed at a door 36 of the refrigerator. The water is supplied via a water line 38 plumbed into a building supply, and passes through a cabinet 40 of the refrigerator 34, and into the refrigerator door 36 at a hinge 42 for the door. The water line 38 in the door 36 is connected to the water filter cartridge system 30, and then a connecting water line 44 leads up to a water dispenser 46 accessible from an outside of the door. The water filter cartridge system 30 may be accessible for removal and replacement, such as at a stationary ventilation grill 48 positioned below the door 36.

Figure 7:
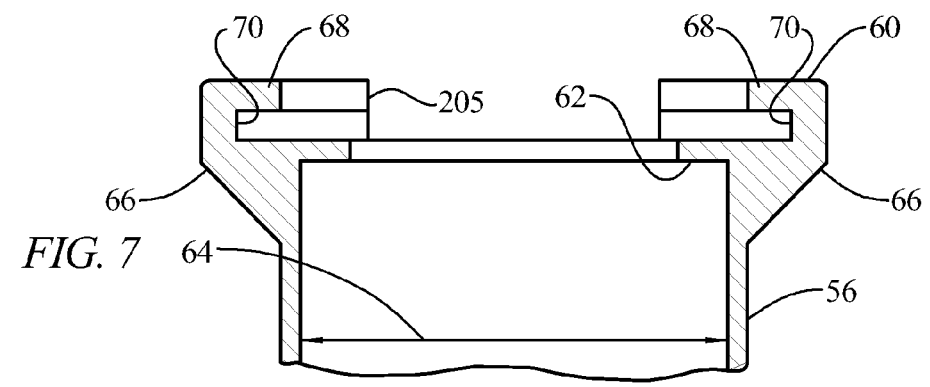
FIG. 7 is a partial side sectional view of a housing component used in the water filter cartridge system.

As illustrated in more detail in FIGS. 2-16, the water filter cartridge system 30 includes a housing 56 which may be permanently attached to the refrigerator 34, such as via a mounting bracket 57. The housing 56 may be in the form of a cylinder with a first open end 58, a second end 60 having a pair of internal flanges 62 (FIG. 7) extending partially around an inner diameter 64 of the housing and a pair of radially outwardly extending ears 66 carrying an inwardly facing pair of tabs 68. The tabs 68 extend circumferentially a portion of the way around the interior of the housing 56, for example about 60 degrees each (FIG. 2). The ears 66 extend axially further away from the first end 58 than the position of the internal flanges 62, such that the inwardly facing pair of tabs 68 are spaced axially from the internal flanges 62, thereby forming two segments of a circumferential groove 70 between the internal flanges 62 and the inwardly facing pair of tabs 68 along the arcuate length of the tabs.

The water filter cartridge system 30 also includes a valve body 72 (FIGS. 4, 12 and 13) which has an inlet passage 74 and an outlet passage 76 extending therethrough in an axial direction, parallel to one another and laterally spaced from one another. The inlet and outlet passages 74, 76 may be formed to receive a connection fitting (not shown), perhaps in the form of a push fit fitting, such as a John Guest™ fitting. For example, an interior wall 78 of the inlet 74 and outlet 76 passages may be formed as a series of steps 80 with seats 82 for receiving the connection fittings. The inlet and outlet passages 74, 76 terminate at an inner face 84 (FIGS. 4, 13) of the valve body 72, and at the inner face, the inlet and outlet passages may be provided with a spider 86 to reduce the open area of the inlet and outlet passages at the inner face.

Figure 12:
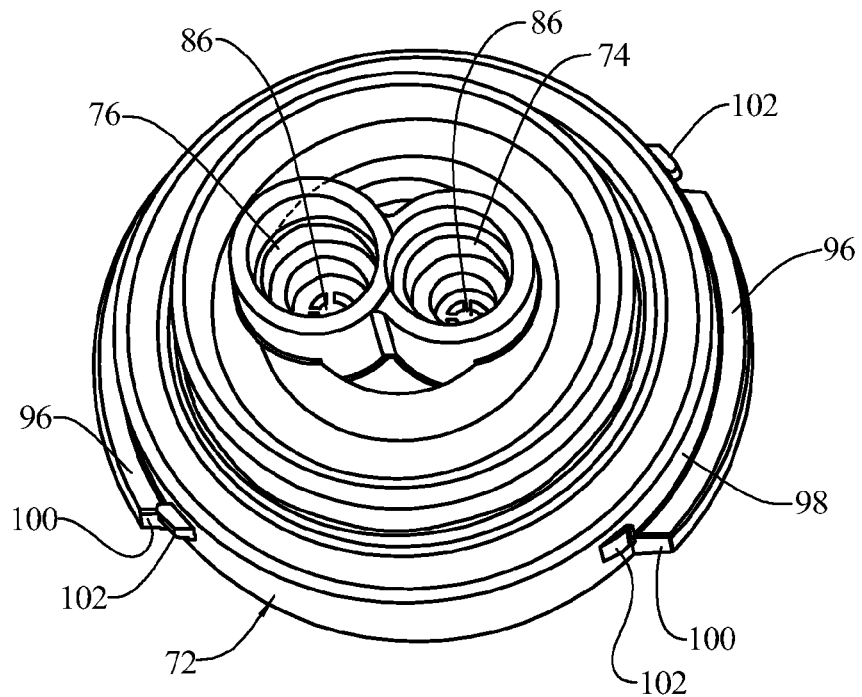
FIG. 12 is an outside perspective view of the valve body.
Figure 13:
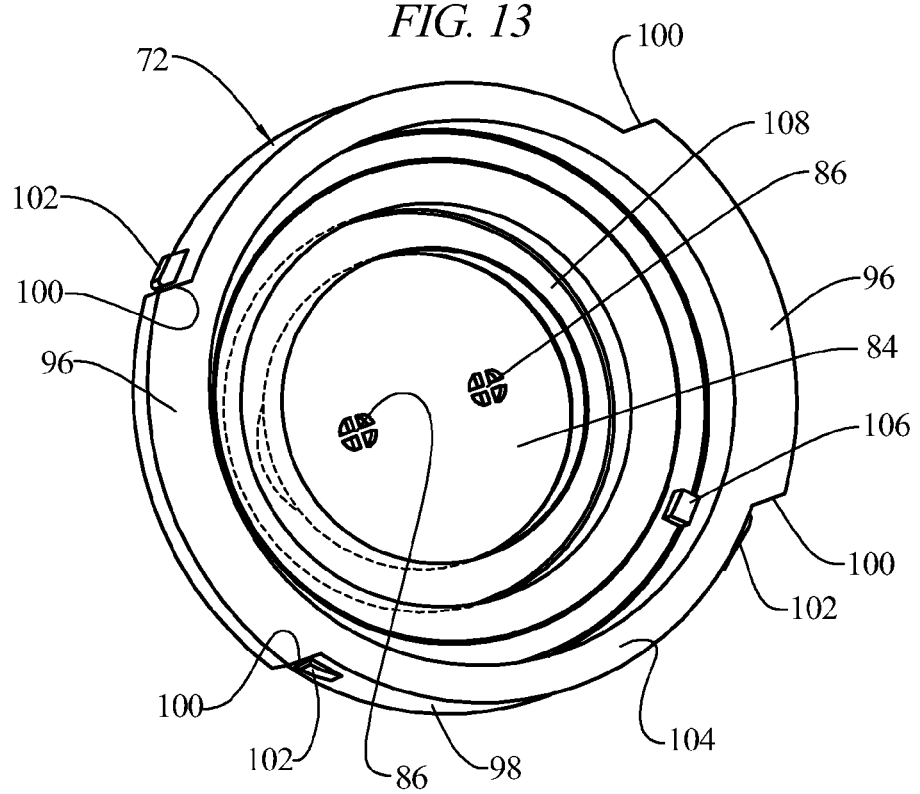
FIG. 13 is an inside perspective view of the valve body.

The valve body 72 may have an outer flange 88 with steps 90 extending radially and circumferentially, the steps comprising a series of alternating radially extending 92 and axially extending 94 walls. The flange 88 may have a pair of opposed radially extending flanges 96 projecting radially from an endmost axially extending wall 98, each tab extending circumferentially through an arc of about 60 degrees. As best seen in FIGS. 12 and 13, adjacent a circumferential end 100 of each of the flanges 96 is a small detent 102 projecting radially from the endmost axially extending wall 98, and lying in a plane parallel to a plane in which the flanges lie, but spaced away from a free end 104 of the endmost axially extending wall. Projecting radially inwardly from the endmost axially extending wall 98, and lying against an adjacent one of the radially extending walls 92 may be a small tab 106 (FIG. 13). The inner face 84 may have a groove 108 (FIG. 4) formed therein which surrounds the inlet and outlet passages 74, 76.

The water filter cartridge system 30 includes a filter 110 (FIGS. 6, 11) having a porous filter body 112 that may have a cylindrical shape, a first 114 and second 116 impermeable end cap at each end of the filter body, a surrounding impermeable cartridge 118 and an end cover 120. The cartridge has an outer diameter 122 sized to fit within the housing 56. The end caps 114, 116 may be permanently attached to a respective end face 124, 126 of the filter body 112, such as by an adhesive material, and each include a lip portion 128, 130 which overlies a portion of a side wall 132 of the filter body, to position the end caps correctly on the end faces. The end caps 114, 116 assure that water or other liquid entering the filter cartridge 118 will be forced to flow through the side wall 132, and not short circuit through the end faces 124, 126. An open passage 134 is provided at a central portion of the filter body 112 for filtered liquid. The first end cap 114 has a passage 136 formed therein to allow filtered liquid to flow therethrough. The end cover 120 may be secured to the cartridge 118 in a permanent and non-removable fashion, such as by adhesive, spin welding, fasteners or other well known attachment arrangements.

Figure 3:
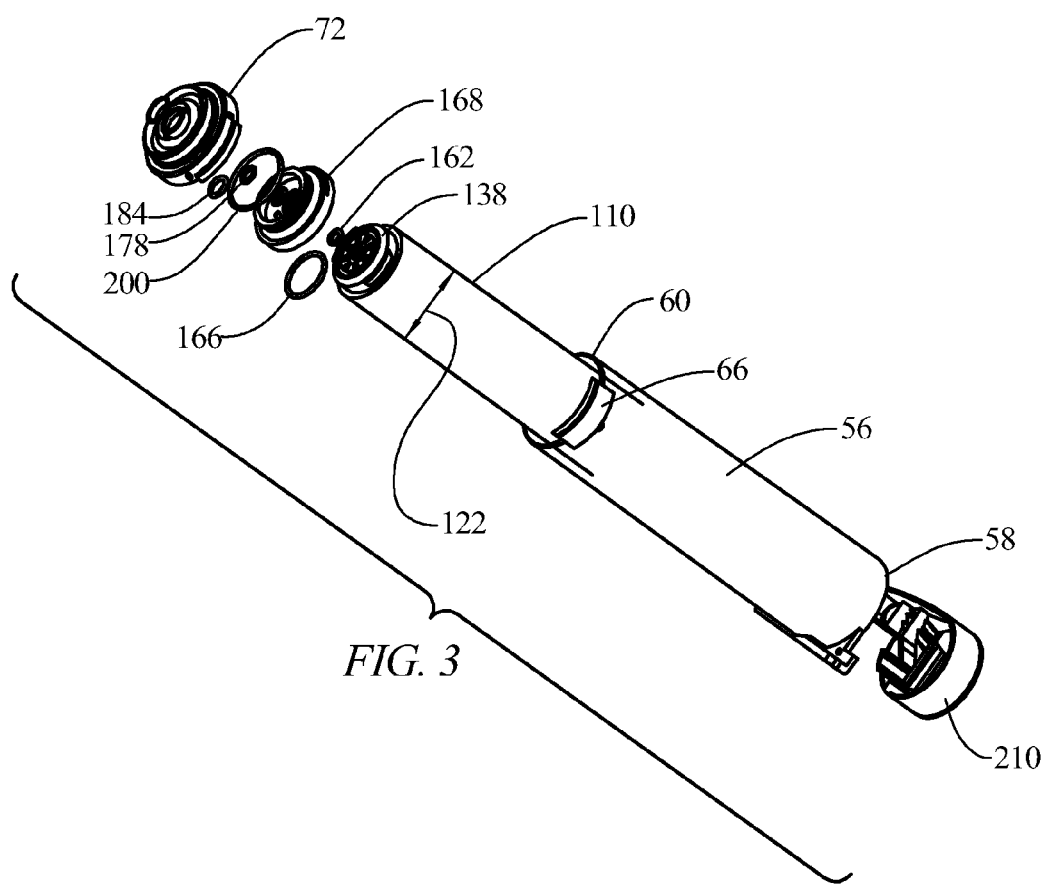
FIG. 3 is an exploded perspective view of components of the water filter cartridge system of FIG. 2.
Figure 4:
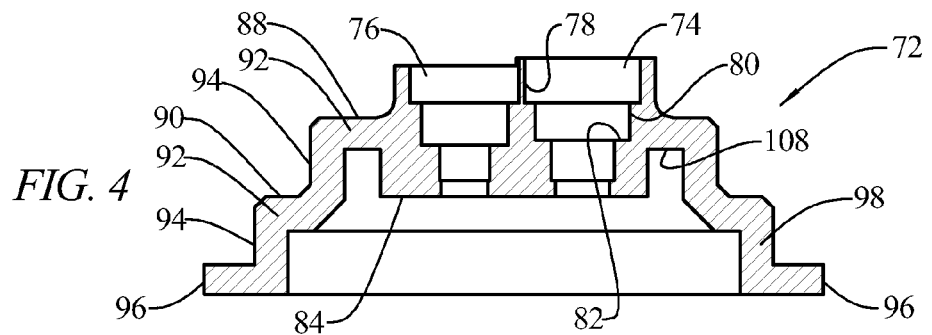
FIG. 4 is a side sectional view of a valve body component used in the water filter cartridge system.
Figure 5:
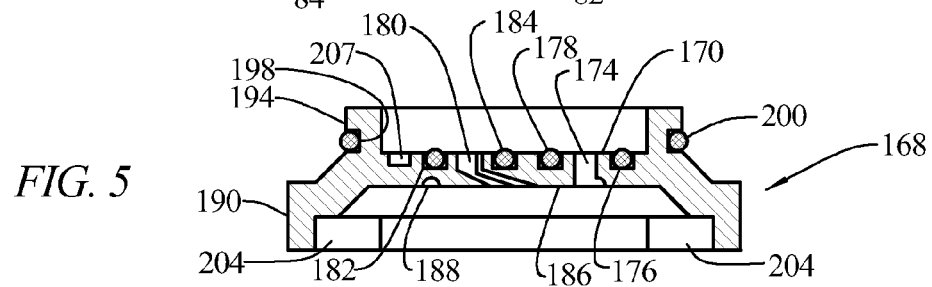
FIG. 5 is a side sectional view of a valve actuator component used in the water filter cartridge system.
Figure 6:
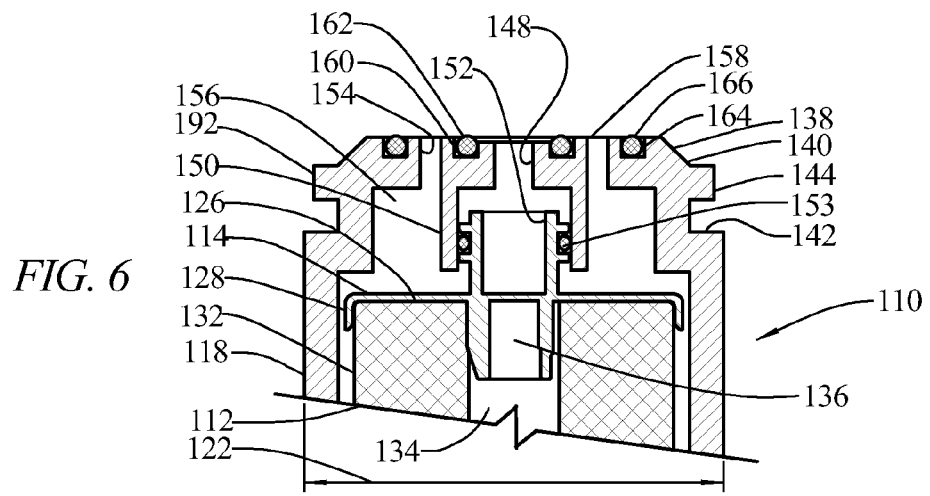
FIG. 6 is a partial side sectional view of a filter component used in the water filter cartridge system.

The filter cartridge 118 has a first end 138 that has a stepped outer surface 140 forming a shoulder 142 with a pair of opposed tabs 144 extending radially therefrom, spaced from the shoulder. The filter cartridge 118 can be inserted into the open end 58 of the housing 56 and the shoulder 142 is sized to abut against and loosely engage the internal flanges 62 of the housing 56 to prevent the cartridge 118 from passing completely through the housing (FIG. 8). The exploded illustration of FIG. 3 schematically shows the filter cartridge 118 extending out of the end of the housing 56, however, the actual geometry of the parts does not allow this to occur. The tabs 144 are sized to pass between adjacent internal flanges 62 of the housing, and then when the filter cartridge 118 is rotated a quarter turn, the tabs 144 will overlie the internal flanges 62 to secure the filter cartridge axially relative to the housing 56 as described later. Leading edges 146 (FIG. 10) of the tabs 144 may be sloped so that the filter cartridge 118 is moved axially further into the housing 56 as the cartridge is rotated, as explained in greater detail below.

The first end 138 of the filter cartridge 118 has a central outlet passage 148 which includes a cylindrical wall 150 sized to receive a tubular projection 152 of the first end cap 114 which has the passage 136 formed therein. The tubular projection 152 is sealingly joined to the cylindrical wall 150, such as by an O-ring seal 153, or other sealing arrangements.

The first end 138 of the filter cartridge 118 also has a plurality of inlet passages 154 formed therein arranged in a ring surrounding and spaced radially outward of the central outlet passage 148. The inlet passages 154 lead to a chamber 156 forming the interior of the filter cartridge 118 occupied by the filter body 112. An end face 158 of the first end 138 of the filter cartridge 118 is provided with a first circular seal gland 160 surrounding the central outlet passage 148, and positioned radially inward of the ring of inlet passages 154. An O-ring seal 162 may be positioned in this gland. A second circular seal gland 164 surrounds the ring of inlet passages 154. An O-ring seal 166 may be positioned in this gland. The end face 158 may be planar such that the first 160 and second 164 seal glands, and the O-ring seals 162, 166 lie in the same plane.

The water filter cartridge system further includes a valve actuator 168 (FIGS. 5, 14, 15) which is positioned between the first end 138 of the filter cartridge 118 and the valve body 72 when the entire system is assembled. The valve actuator 168 has a first face 170 facing towards the valve body 72 which includes an inlet passage 174 which may be aligned with the inlet passage 74 in the valve body (FIG. 8). A circular seal gland 176 surrounds the actuator inlet passage 174 in the first face 170. An O-ring seal 178 may be positioned in this gland 176. The first face 170 of the actuator 168 includes an outlet passage 180 which exits the first face in a position that may be aligned with the outlet passage 76 in the valve body 72. A circular seal gland 182 surrounds the actuator outlet passage 180 in the first face 170. An O-ring seal 184 may be positioned in this gland 182.

The valve actuator 168 has a second face 186 facing away from the valve body 72 and towards the end face 158 of the filter cartridge. The inlet passage 174 exits at the second face 186 and intersects a circular channel 188 which extends around the second face and aligns with the plurality of inlet passages 154 in the first end 138 of the filter cartridge 118. The outlet passage 180 of the valve actuator 168 extends through the actuator at an angle and exits the second face 186 at a central location, aligned with the outlet passage in the first end 138 of the filter cartridge 118. The seals 178, 184 are dynamic axial seals in that they effect a seal between the valve actuator 168 and the valve body 72 by means of a sliding motion between the two facing surfaces 154, 186.

The valve actuator 168 may have an axially extending flange 190 which closely surrounds and receives an outer peripheral edge 192 of the tabs 144 formed on the first end 138 of the filter cartridge 118. The valve actuator 168 may also have an axially extending circular wall 194 extending from the first face 170 which is received in the circular groove 108 formed in the valve body 72. The circular wall 194 includes an outwardly facing seal gland 198 formed therein for receiving an O-ring seal 200 which engages with a side wall of the groove 196, and thus comprises a radial seal.

Figure 14:
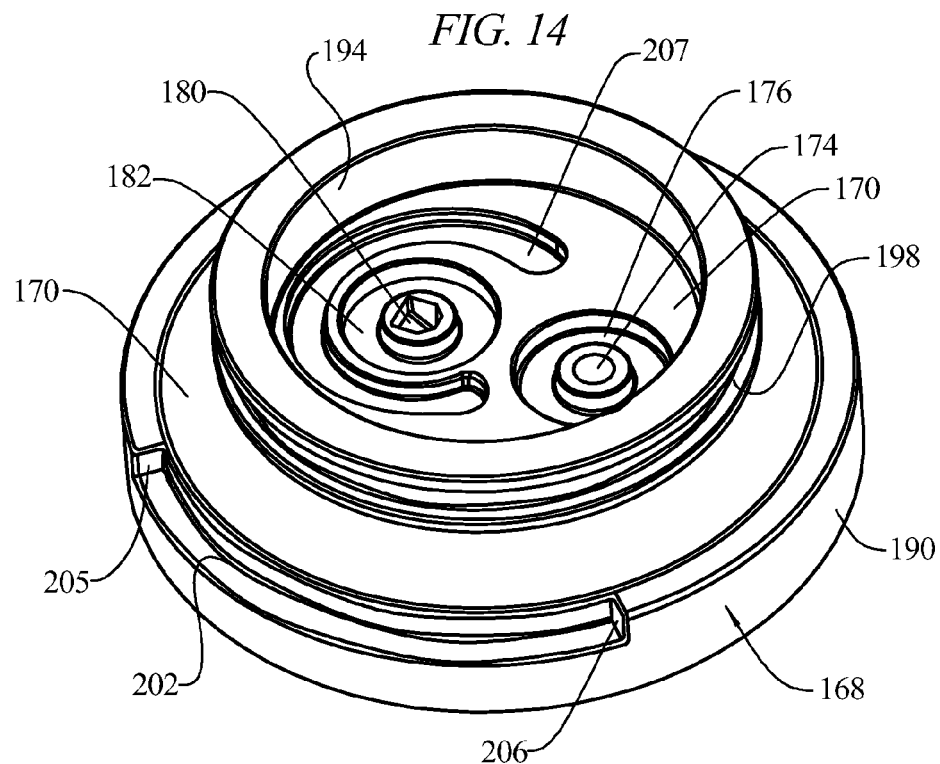
FIG. 14 is an outside perspective view of the valve actuator.
Figure 15:
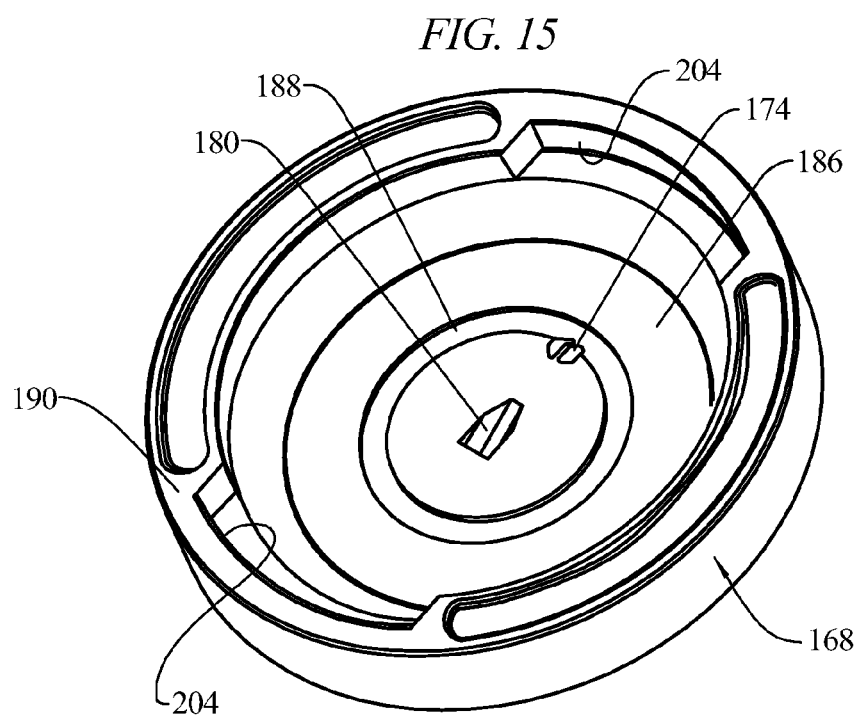
FIG. 15 is an inside perspective view of the valve actuator.
Figure 16:
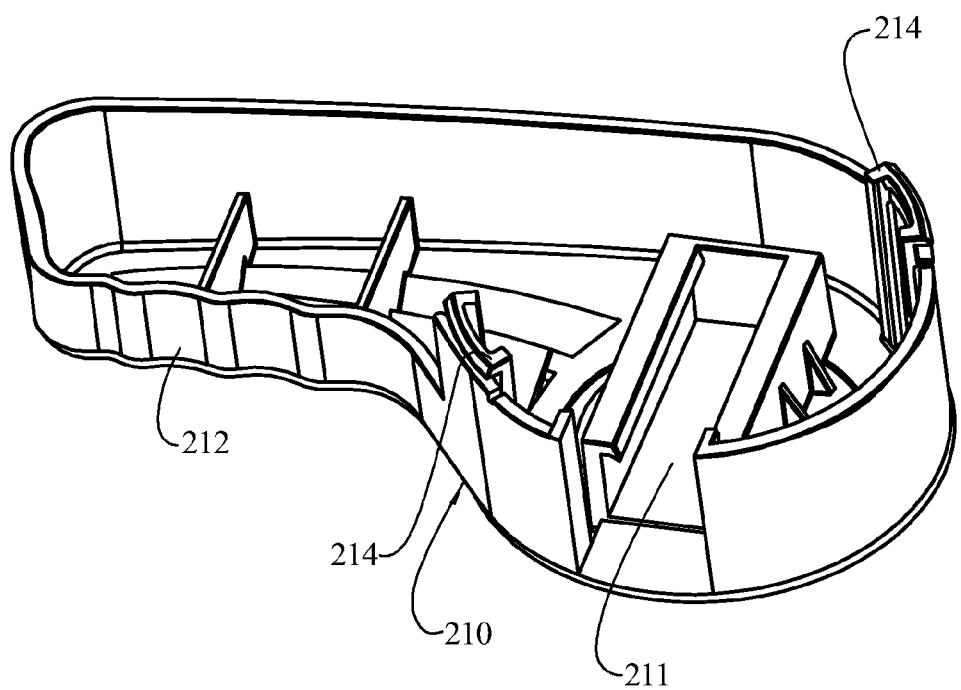
FIG. 16 is an inside perspective view of the cartridge handle.

The valve actuator 168, at an edge of the top face 170, also includes a groove 202 FIG. 14) which receives the tab 106 of the valve body 72. The groove 202 has an angular extent of approximately 90 degrees, so the valve actuator 168 is permitted to rotate only 90 degrees relative to the valve body 72. The valve actuator 168 has a pair of opposed recesses 204 formed in the axially extending flange 190 which are sized to receive the tabs 144 of the filter cartridge 118. Rotation of the filter cartridge 118 will therefore cause co-rotation of the valve actuator 168.

To assemble the system 30, the valve actuator 168 is inserted into the end 60 of the housing 56 such that its axially extending flange 190 rests on the inwardly facing flanges 62 of the housing. The valve body 72 is inserted into the end 60 of the housing 56 overlying the valve actuator 168, the valve body 72, housing 56, and valve actuator 168 forming an assembly to define a fluid valve. The valve body 72 is rotated approximately 90 degrees, so that the radially projecting flanges 96 of the valve body engage under the tabs 68 of the housing 56, thereby holding the valve body, the valve actuator 168 and the housing together as a unit and capturing the valve actuator between the valve body and the housing (FIGS. 8, 9). The detents 102 on the valve body 72 engage with endwalls 70 of the inwardly facing tabs 68 on the housing 56 to lock the valve body in the assembled rotational position relative to the housing.

The assembled filter cartridge 118 is inserted from the first end 58 of the housing 56, sufficiently into the housing such that the radial tabs 144 of the cartridge are positioned between the inwardly facing flanges 62 of the housing. The radial tabs 144 will be received in the recesses 204 in the valve actuator 168. The filter cartridge 56 is rotated approximately 90 degrees in a first direction, such as clockwise, the sloped surfaces 146 of the cartridge tabs 144 causing the face 158 of the end 138 of the filter cartridge to move axially towards the second face 186 of the valve actuator 168, compressing the concentric O-ring seals 162, 166 between the filter cartridge and the valve actuator. Since rotation of the filter cartridge 118 also causes co-rotation of the valve actuator 168, as discussed above, the O-ring seals 162, 166, which comprise axial seals, are only compressed and no sliding between the parts or seals occurs, thereby forming a static face seal (axial seal) which enhances and preserves the seal. In this way, there is no chance for the O-ring seals 162, 166 to dislodge from the seal glands 160, 164. Rotation of the cartridge 118 and valve actuator 168 continues until the tab 106 of the valve body 72 strikes an end wall 206 of the groove 202 in the valve actuator, preventing further rotation of the valve actuator relative to the valve body.

When this rotation assembly occurs, the alignment of the parts is that as shown in FIG. 8, with the inlet passage 174 in the valve actuator 168 aligned with the inlet passage 74 in the valve body 72 and the inlet passage 154 of the filter cartridge 118 to permit communication between the inlet passages and define a system inlet passage. The outlet passage 180 in the valve actuator 168 is also aligned with the outlet passage 76 in the valve body 72 and the outlet passage 148 in the filter cartridge 118 to permit communication between the outlet passages and define a system outlet passage. In such an orientation, water, or other liquid, flows in through the valve body inlet passage 74, through the valve actuator inlet passage 174, around the distribution channel 188 and into the inlet passages 154 of the filter cartridge 118. The outer O-ring seal 166 and the inner O-ring seal 162 define the inlet flow path at the interface between the filter cartridge 118 and the valve actuator 168. The liquid flows into the chamber 156, past the end cap 114, and through the side wall 132 of the filter body 112. The liquid flows into the center passage 134, now filtered, and through the outlet passage 136 in the end cap 114, to the outlet passage 148 in the filter cartridge 118, through the outlet passage 180 in the valve actuator 168, and out through the outlet passage 76 of the valve body 72. The inner O-ring seal 162 defines the outlet flow path, on its interior, at the interface between the filter cartridge 118 and the valve actuator 168.

When the filter cartridge 118 is to be removed, such as for replacement with another filter cartridge, the filter cartridge is rotated approximately 90 degrees in the opposite direction, such as counter-clockwise, causing the valve actuator 168 to also rotate 90 degrees. This places the valve actuator 168 in the position shown in FIG. 9, with the inlet passage 174 and outlet passage 180 of the valve actuator displaced out of alignment relative to the inlet passage 74 and outlet passage 76 of the valve body 72 (and not visible in FIG. 9).

This position prevents communication between common passages, that is, between the two inlet passages 74, 174 and between the two outlet passages 76, 180. A groove 207 (FIGS. 5, 14) in the face 170 of the valve actuator 168 has its ends moved into alignment with the inlet 74 and outlet 76 passages of the valve body 72, such that liquids flowing into the inlet passage 74 will be diverted into the groove 207 to the outlet passage 76, automatically bypassing the remainder of the filter system. This groove 207 forms a bypass conduit which will permit the filter cartridge 118 to be removed and replaced, even if a liquid is flowing through the inlet 74 and outlet 76 passages, or will permit continued use of the liquid dispensing system 32 that the filter system 30 is a part of, even if the filter cartridge 118 is not in place. The O-ring 198 carried by the valve actuator 168 assures that any liquid in the space between the first face 170 of the valve actuator and the inner face 84 of the valve body 72 will not leak out of the assembly, and the O-rings 178, 184 will assure that no liquid will flow into the inlet 174 or outlet 180 passages in the valve actuator.

In order to prevent unintentional dislodging of the O-rings 162, 166 from the end face 158 of the filter cartridge 118 as it is being removed and replaced, the O-rings may be overmolded onto the end face of the filter cartridge. Alternatively, the O-rings 162, 166 may be held onto the filter cartridge 118 by capillary action provided by silicone grease. In any event, the O-rings are to be removed and replaced each time the cartridge 118 is replaced, assuring a proper sealing of the flow paths. Since there is sliding rotational movement between the valve actuator 168 and the valve body 72, there is a slight chance that the O-rings 178, 184 will unseat from their glands 170, 182. The spiders 86 in the inlet 74 and outlet 76 passage openings will prevent the O-rings from extruding into those openings which might otherwise cause leakage.

To assist in insertion and removal of the filter cartridge 118, the end cover 120 of the filter 110 may be provided with a projecting element 208, such as a rectangular shaped element (FIG. 11). A handle 210 (FIGS. 3, 16) may be provided to engage, such as at a pocket 211 with the projecting element 208, and may have an extending arm 212 to give the user greater leverage, and to apply greater torque, when rotating the filter cartridge 118. The handle 210 may be removed from the projecting element 208, and attached to the water dispensing unit, such as the grill 48 of the refrigerator 34, even when the filter cartridge 118 is not in place. Connection arrangements, such as flexible fingers 214 may be provided which will hold the handle 210 in place on the water dispensing unit, and will even allow rotation of the handle relative to the grill 48, with or without the filter cartridge 118.

The present invention has been described utilizing particular embodiments. As will be evident to those skilled in the art, changes and modifications may be made to the disclosed embodiments and yet fall within the scope of the present invention. For example, various components could be utilized separately or independently in some embodiments without using all of the other components in the particular described embodiment. The disclosed embodiment is provided only to illustrate aspects of the present invention and not in any way to limit the scope and coverage of the invention. The scope of the invention is therefore to be limited only by the appended claims.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. A replaceable filter for a liquid filter cartridge system comprising a valve body having a fluid inlet passage and a fluid outlet passage, a valve actuator having a fluid inlet passage and a fluid outlet passage, with the valve body and valve actuator being relatively rotatable to control fluid flow through the valve body and the valve actuator by aligning and unaligning the respective fluid inlet passages and fluid outlet passages, the replaceable filter comprising:
   a cartridge defining an interior;
   a filter body located within the interior;
   a first end provided on the cartridge having an end face, a fluid inlet passage extending through the end face into the interior, and a fluid outlet passage extending through the end face into the interior;
   a rotational coupler provided on the first end rotationally coupling the cartridge with the valve actuator for co-rotation; and
   a face seal provided on the end face and arranged to abut the valve actuator when the cartridge is coupled with the valve actuator;
   wherein when the cartridge is coupled with the valve actuator for co-rotation, the face seal abuts the valve actuator to form a seal between the first end and the valve actuator that fluidly seals the fluid inlet passage and the fluid outlet passage of the first end.

2. The replaceable filter of claim 1 wherein the rotational coupler fluidly aligns the fluid inlet and fluid outlet passages of the first end with the corresponding fluid inlet and fluid outlet passages of the valve actuator without relative rotation between the cartridge and the valve actuator.

3. The replaceable filter of claim 2 wherein the rotational coupler comprises at least one tab extending from the first end and forming an alignment key that mates with the valve actuator to fluidly align the fluid inlet and fluid outlet passages of the first end with the corresponding fluid inlet and fluid outlet passages of the valve actuator.

4. The replaceable filter of claim 1 wherein the rotational coupler comprises at least one tab extending from the first end and mating with the valve actuator to rotationally couple the cartridge and the valve actuator for co-rotation.

5. The replaceable filter of claim 4 wherein the at least one tab also mates with the valve actuator to fluidly align the fluid inlet and fluid outlet passages of the first end with the corresponding fluid inlet and fluid outlet passages of the valve actuator.

6. The replaceable filter of claim 4 wherein the at least one tab comprises a sloped surface.

7. The replaceable filter of claim 1 wherein the face seal surrounds at least one of the fluid inlet passage and fluid outlet passage of the first end.

8. The replaceable filter of claim 1 wherein the face seal surrounds both of the fluid inlet passage and fluid outlet passage of the first end.

9. The replaceable filter of claim 8 wherein the face seal fluidly separates the fluid inlet passage and fluid outlet passage of the first end on the end face.

10. The replaceable filter of claim 1 wherein the face seal comprises a first seal for sealing the fluid inlet passage of the first end and a second seal for sealing the fluid outlet passage of the first end.

11. The replaceable filter of claim 10 wherein the fluid inlet passage and fluid outlet passage of the first end are concentrically located on the end face, with one of the first and second seal surrounding one of the fluid inlet passage and fluid outlet passage of the first end and the other of the first and second seal surrounding both the fluid inlet passage and fluid outlet passage of the first end.

12. The replaceable filter of claim 10 wherein the first seal and second seal lie in the same plane.

13. The replaceable filter of claim 12 wherein the first seal and second seal lie in the same plane as the end face.

14. The replaceable filter of claim 1 wherein the fluid inlet passage of the first end has at least one inlet opening located on an upstream end of the fluid inlet passage, and the fluid outlet passage of the first end has at least one outlet opening located on a downstream end of the fluid outlet passage.

15. The replaceable filter of claim 14 wherein at least a portion of the face seal lies at least one of upstream and downstream of the at least one inlet opening.

16. The replaceable filter of claim 14 wherein at least a portion of the face seal lies at least one of upstream and downstream of the at least one outlet opening.

17. The replaceable filter of claim 14 wherein at least one of the inlet opening and the outlet opening lies in the same plane as the end face.

18. The replaceable filter of claim 14 wherein the at least one inlet opening comprises multiple inlet openings.

19. The replaceable filter of claim 18 wherein the multiple inlet openings surround the at least one outlet opening.

20. The replaceable filter of claim 19 wherein the face seal comprises a first seal surrounding the multiple inlet openings and the at least one outlet opening, and a second seal surrounding the at least one outlet opening and fluidly separating the at least one outlet opening from the multiple inlet openings.

21. The replaceable filter of claim 20 wherein the rotational coupler fluidly aligns the fluid inlet and fluid outlet passages of the first end with the corresponding fluid inlet passage and fluid outlet passage of the valve actuator without relative rotation between the cartridge and the valve actuator.

22. The replaceable filter of claim 21 wherein the rotational coupler comprises at least one tab extending from the first end that mates with the valve actuator to fluidly align the fluid inlet and fluid outlet passages of the first end with the corresponding fluid inlet and fluid outlet passages of the valve actuator and to rotationally couple the cartridge and the valve actuator for co-rotation.

23. The replaceable filter of claim 22 wherein at least one of the inlet opening and the outlet opening lies in the same plane as the end face.

24. The replaceable filter of claim 23 further comprising a first gland formed in the end face and receiving the first seal, and a second gland formed in the end face and receiving the second seal.

25. The replaceable filter of claim 1 wherein the face seal seals the fluid inlet passage and fluid outlet passage of the first end by compression of the face seal against the valve actuator and not by relative sliding between the face seal and the valve actuator.

26. The replaceable filter of claim 1 wherein the end face is planar.

27. The replaceable filter of claim 1 wherein the ace seal between the first end and the valve actuator is formed by compression of the face seal against the valve actuator and not by relative sliding between the face seal and the valve actuator.

28. A replaceable filter for a liquid filter cartridge system comprising a valve body having a fluid inlet passage and a fluid outlet passage, a valve actuator having a fluid inlet passage and a fluid outlet passage, with the valve body and valve actuator being relatively rotatable to control fluid flow through the valve by aligning and unaligning the respective fluid inlet passages and fluid outlet passages, the replaceable filter comprising:
 a cartridge defining an interior;
 a filter body located within the interior;
 a first end provided on the cartridge having a planar end face, a fluid inlet passage extending through the planar end face into the interior, and a fluid outlet passage extending through the planar end face into the interior;
 a rotational coupler provided on the first end rotationally coupling the cartridge with the valve actuator for co-rotation; and
 a face seal provided on the planar end face and arranged to abut the valve actuator when the cartridge is coupled with the valve actuator;
 wherein when the cartridge is coupled with the valve actuator for co-rotation, the face seal abuts the valve actuator to form a seal between the first end and the valve actuator that fluidly seals the fluid inlet passage and the fluid outlet passage of the first end by compression of the face seal against the valve actuator and not by relative sliding between the face seal and the valve actuator.

29. A replaceable filter for a liquid filter cartridge system comprising a valve body having a fluid inlet passage and a fluid outlet passage, a valve actuator having a fluid inlet passage and a fluid outlet passage, with the valve body and valve actuator being relatively rotatable to control fluid flow through the valve by aligning and unaligning the respective fluid inlet passages and fluid outlet passages, the replaceable filter comprising:
 a cartridge defining an interior;
 a filter body located within the interior;
 a first end provided on the cartridge having a planar end face, a fluid inlet passage extending through the planar end face into the interior, and a fluid outlet passage extending through the planar end face into the interior; and
 a face seal provided on the planar end face and arranged to form a seal between the first end and the valve actuator that fluidly seals the fluid inlet passage of the first end relative to the fluid outlet passage of the first end by compression of the face seal against the valve actuator and not by relative sliding between the face seal and the valve actuator.

30. The replaceable filter of claim 29 further comprising a coupler provided on the first end coupling the cartridge to the valve actuator while fluidly aligning the fluid inlet and fluid outlet passages of the first end with the corresponding fluid inlet and fluid outlet passages of the valve actuator without rotating the cartridge relative to the valve actuator.

31. The replaceable filter of claim 30 wherein the coupler is a rotational coupler coupling the cartridge to the valve actuator for co-rotation.

32. The replaceable filter of claim 31 wherein the rotational coupler comprises at least one tab extending from the first end and forming an alignment key that mates with the valve actuator to fluidly align the fluid inlet and fluid outlet passages of the first end with the corresponding fluid inlet and fluid outlet passages of the valve actuator.

33. The replaceable filter of claim 31 wherein the rotational coupler comprises at least one tab extending from the first end and mating with the valve actuator to rotationally couple the cartridge and the valve actuator for co-rotation.

34. The replaceable filter of claim 33 wherein the at least one tab also mates with the valve actuator to fluidly align the fluid inlet and fluid outlet passages of the first end with the corresponding fluid inlet and fluid outlet passages of the valve actuator.

35. The replaceable filter of claim 33 wherein the at least one tab comprises a sloped surface.

36. The replaceable filter of claim 29 wherein the face seal comprises a first seal for sealing the fluid inlet passage of the first end and a second seal for sealing the fluid outlet passage of the first end.

37. The replaceable filter of claim 36 wherein the first seal and second seal lie in the same plane.

38. The replaceable filter of claim 29 wherein the fluid inlet passage of the first end has at least one inlet opening located on an upstream end of the fluid inlet passage, and the fluid outlet passage of the first end has at least one outlet opening located on a downstream end of the fluid outlet passage.

39. The replaceable filter of claim 38 wherein the at least one inlet opening comprises multiple inlet openings.

40. The replaceable filter of claim 39 wherein the multiple inlet openings surround the at least one outlet opening.

\* \* \* \* \*